(12) United States Patent
Chiang

(10) Patent No.: US 8,136,775 B2
(45) Date of Patent: Mar. 20, 2012

(54) RACK ASSEMBLY

(76) Inventor: Vance Chiang, Taichung (TW)

( * ) Notice: Subject to any disclaimer, the term of this patent is extended or adjusted under 35 U.S.C. 154(b) by 274 days.

(21) Appl. No.: 12/459,244

(22) Filed: Jun. 30, 2009

(65) Prior Publication Data

US 2010/0326930 A1    Dec. 30, 2010

(51) Int. Cl.
*A47F 7/00* (2006.01)
(52) U.S. Cl. ......... 248/220.22; 248/223.41; 248/225.11; 248/225.21; 248/235; 211/87.01
(58) Field of Classification Search ............ 248/220.21, 248/220.22, 223.41, 225.11, 225.21, 235, 248/241; 211/87.01, 90.01, 94.01
See application file for complete search history.

(56) References Cited

U.S. PATENT DOCUMENTS

| | | | |
|---|---|---|---|
| 7,591,385 B2 * | 9/2009 | Brooks | 211/94.01 |
| 7,802,389 B2 * | 9/2010 | Nagel et al. | 40/642.01 |
| 2001/0004099 A1 * | 6/2001 | Onishi | 248/49 |
| 2006/0022100 A1 * | 2/2006 | Lan | 248/220.21 |
| 2007/0007409 A1 * | 1/2007 | Huang | 248/220.21 |

* cited by examiner

*Primary Examiner* — Amy Sterling
*Assistant Examiner* — Steven Marsh

(57) ABSTRACT

A rack assembly comprises: an elongated main frame, a front surface of which is formed with a first display area, an inclined second display area, and a concave space defined therebetween, the first display area is defined with plural first limiting grooves and a longitudinally-extending first rail, the second display area is provided with at least one second limiting groove and an inclined second rail. At least one base plate is mounted in the concave space and includes a horizontal top portion for pivotally fixing a positioning sleeve and a longitudinal portion formed with at least one hanging hole for fixing to an object. Plural suspension members are detachably engaged in the first and second limiting grooves and each provided with an abutting portion to be abutted against the first and second rails, and a retaining portion to be engaged in the first and second limiting grooves.

8 Claims, 9 Drawing Sheets

RACK ASSEMBLY

BACKGROUND OF THE INVENTION

1. Field of the Invention

The present invention relates to storage and display devices for personal or office use, and more particularly to a DIY rack assembly.

2. Description of the Prior Art

The existing storage and display devices for personal or office use mostly take the form of a unitary structure with a single function, such as the hook on the wall for hanging objects, pen holder standing on a table, stationery container, LCD stand, lamp holder, etc. in addition to the fact that the function of these storage devices is limited and not extensible due to the restriction of the unitary structure, the storage devices are space consuming if they stand side by side on a table.

The present invention has arisen to mitigate and/or obviate the afore-described disadvantages.

SUMMARY OF THE INVENTION

The primary object of the present invention is to provide a DIY rack assembly which can be easily suspended to a wall or put on a desk, thus its applicability is considerably improved.

Another object of the present invention is to provide a DIY rack assembly whose applicability and function can be extended at the user's pleasure.

A rack assembly according to the present invention comprises:

an elongated main frame, a front surface of which extending longitudinally to form a first display area, and a lower edge of the first display area being folded and then extending downward at an inclined angle to form a second display area, a concave space being defined between a rear surface of the first display area and the second display area, the first display area being longitudinally defined with a plurality of parallel and spaced-apart first limiting grooves, each of the first limiting grooves being provided with a longitudinally-extending first rail, the second display area being provided with at least one second limiting groove which is defined with an upper horizontally-extending abutting portion and a lower inclined second rail;

at least one base plate longitudinally mounted in the concave space of the main frame and including a horizontal top portion and a longitudinal portion, one end of the top portion being fixed to a top of the rear surface of the first display area, a positioning sleeve being pivotally and detachably disposed on a top portion of the base plate and provided for insertion of a personal belonging with a positioning shaft, the longitudinal portion of the base plate is formed with at least one hanging hole and a plurality of positioning threaded holes for fixing to an object, such as a wall, the longitudinal portion of each base plate is fixed to an object by a screw screwed through the hanging hole; and a plurality of suspension members detachably engaged in the first and second limiting grooves and each being provided with an abutting portion to be abutted against the first and second rails, and a retaining portion to be engaged in the first and second limiting grooves.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-9, a rack assembly in accordance with the present invention comprises: a main frame 10, at least a set of base plates 20 and a plurality of suspension members 30.

Figure 1:
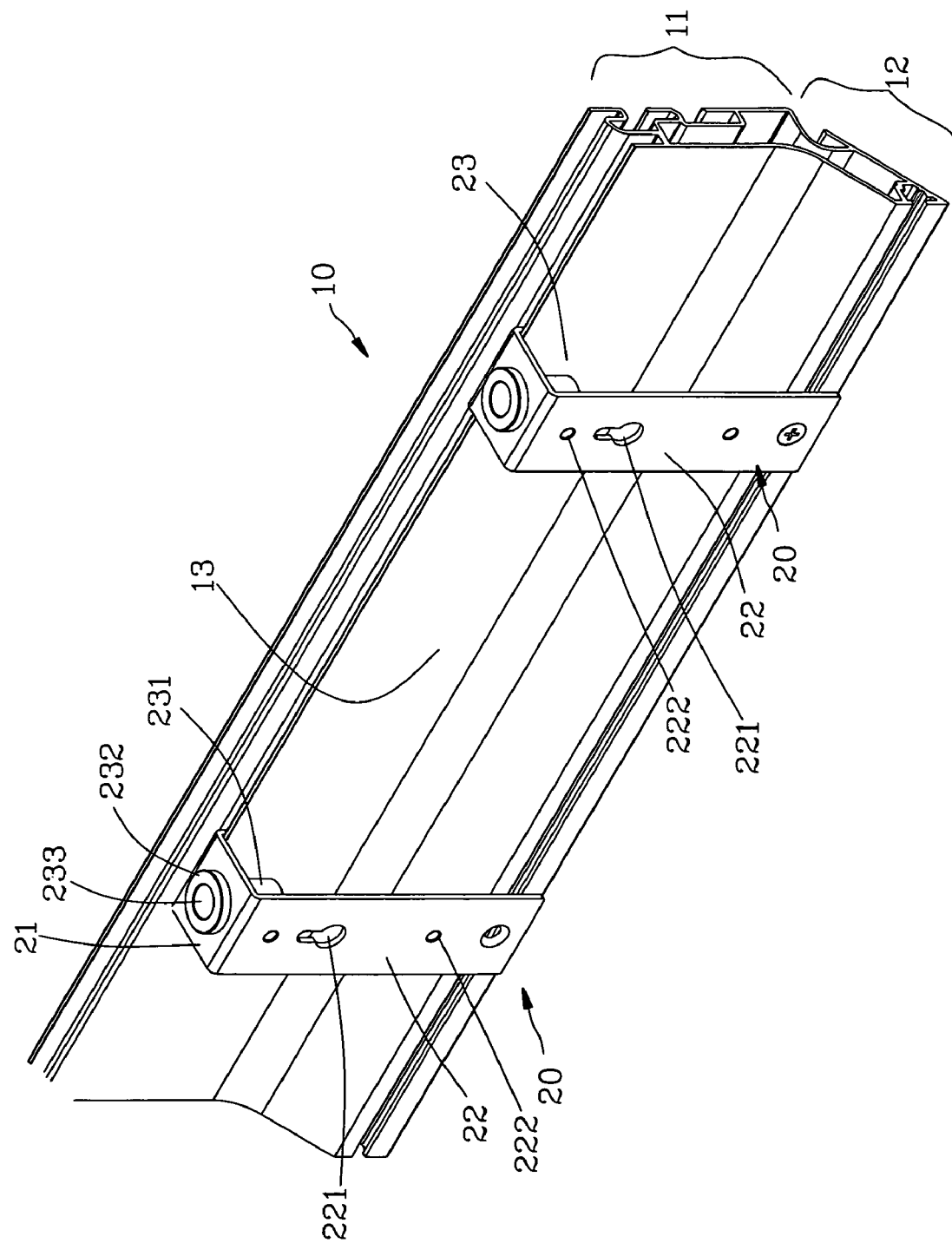
FIG. 1 is an assembly view of a rack assembly in accordance with a first embodiment of the present invention.
Figure 2:
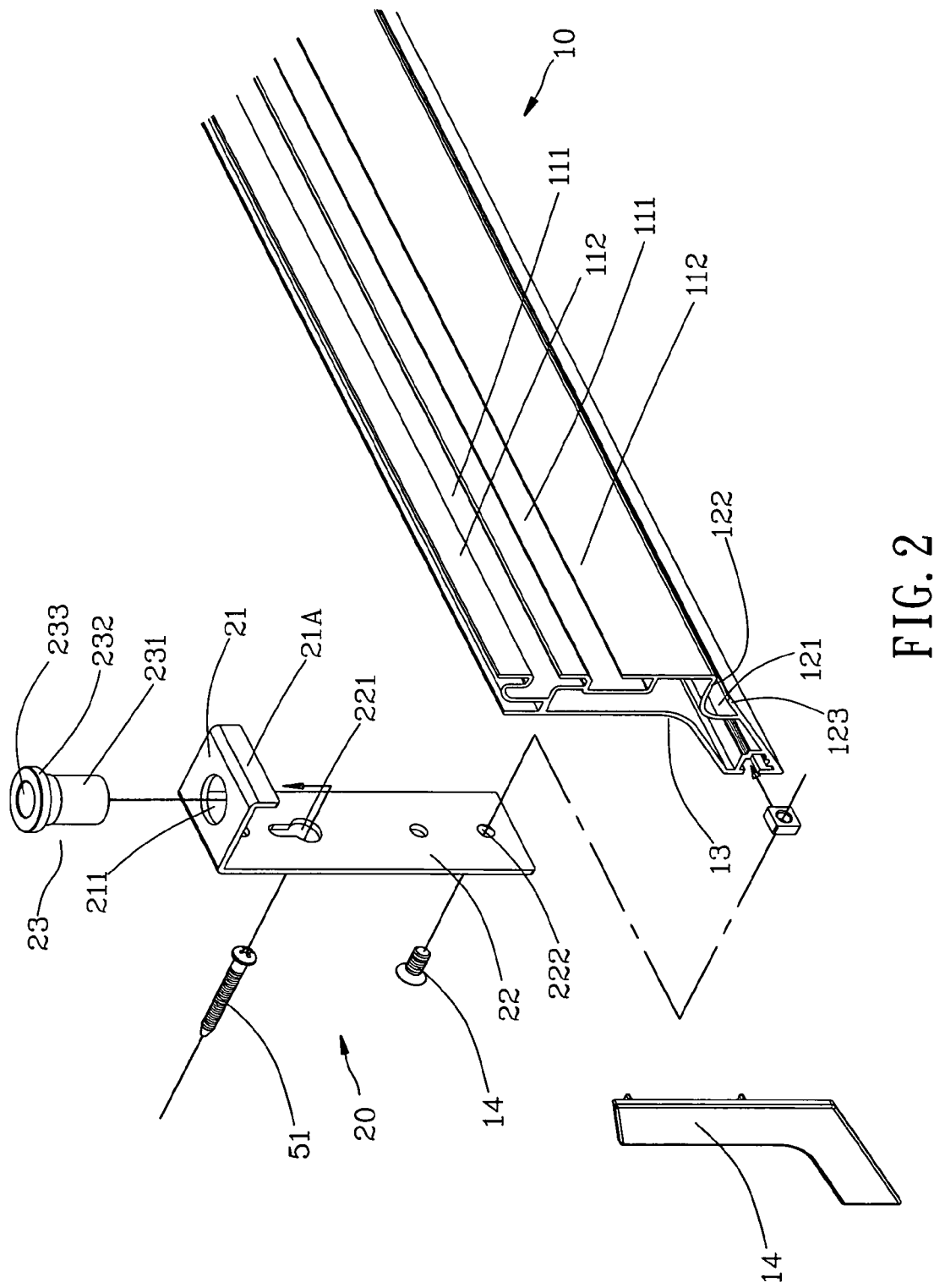
FIG. 2 is an exploded view of the rack assembly in accordance with the first embodiment of the present invention.
Figure 3:
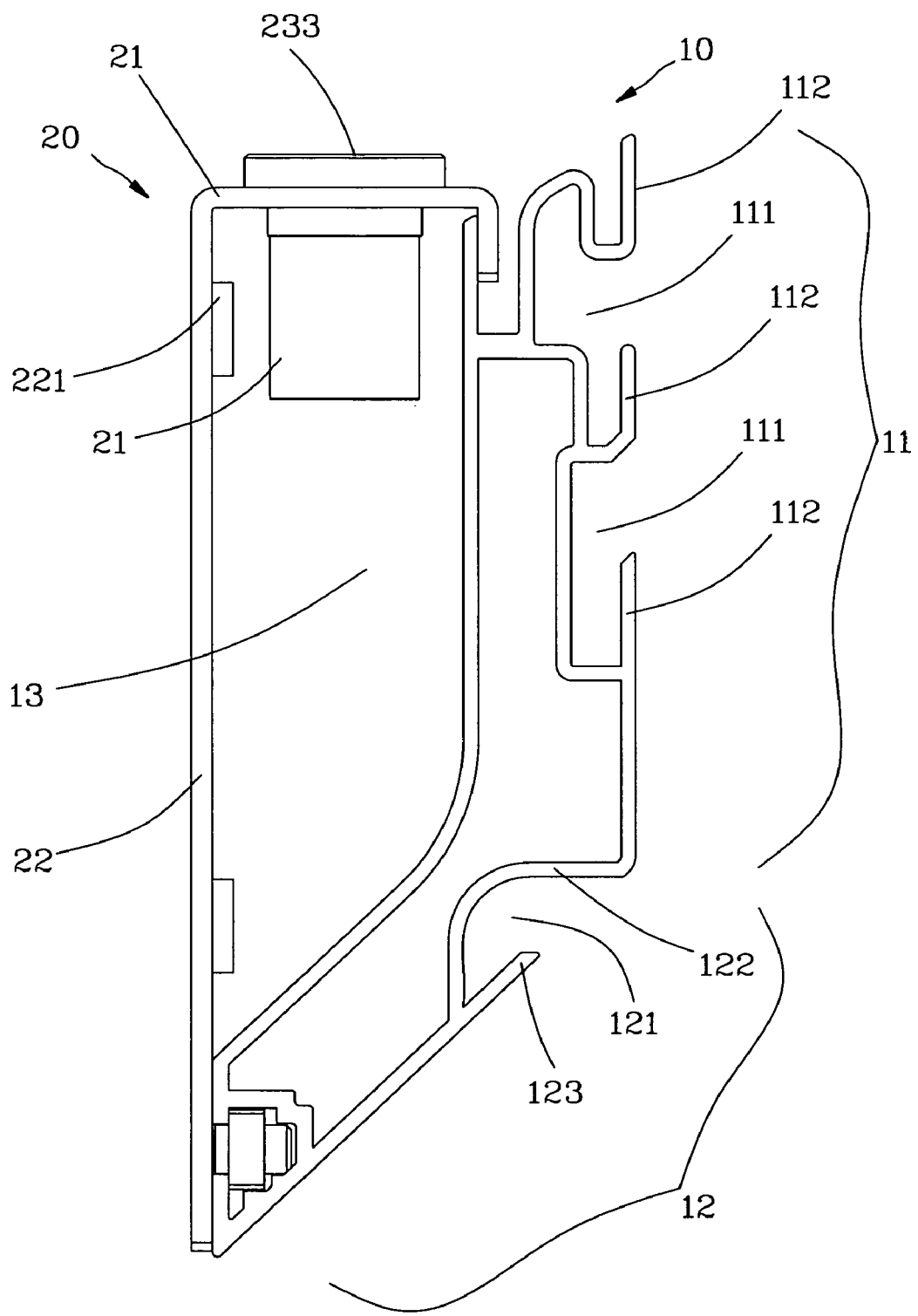
FIG. 3 is a cross sectional view of the rack assembly in accordance with the first embodiment of the present invention.

The main frame 10, as shown in FIGS. 1-3, is an elongated structure, a front surface of which extends longitudinally to form a first display area 11, and a lower edge of the first display area 11 is folded and then extends downward at an inclined angle to form a second display area 12. Meanwhile, a concave space 13 is defined between a rear surface of the first display area 11 and the second display area 12. The first display area 11 is longitudinally defined with a plurality of parallel and spaced-apart first limiting grooves 111 each of which is provided with a longitudinally-extending first rail 112. The second display area 12 is provided with at least one second limiting groove 121 which is defined with an upper horizontally-extending abutting portion 122 and a lower inclined second rail 123. As shown in FIG. 2, both ends of the main frame 10 are covered with a covering plate 14 for protection and aesthetic purpose.

Figure 4:
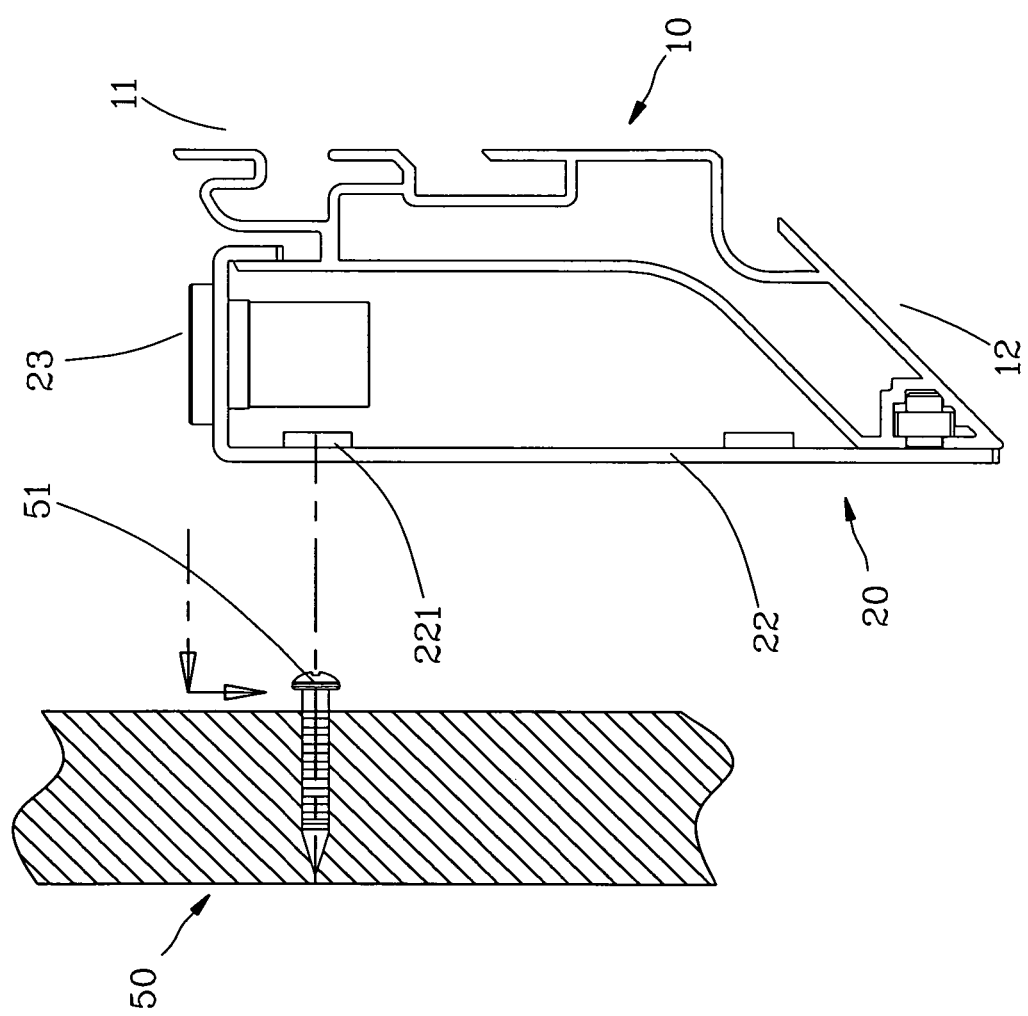
FIG. 4 is an illustrative view showing how to fix the rack assembly in accordance with the first embodiment of the present invention to a wall.
Figure 5:
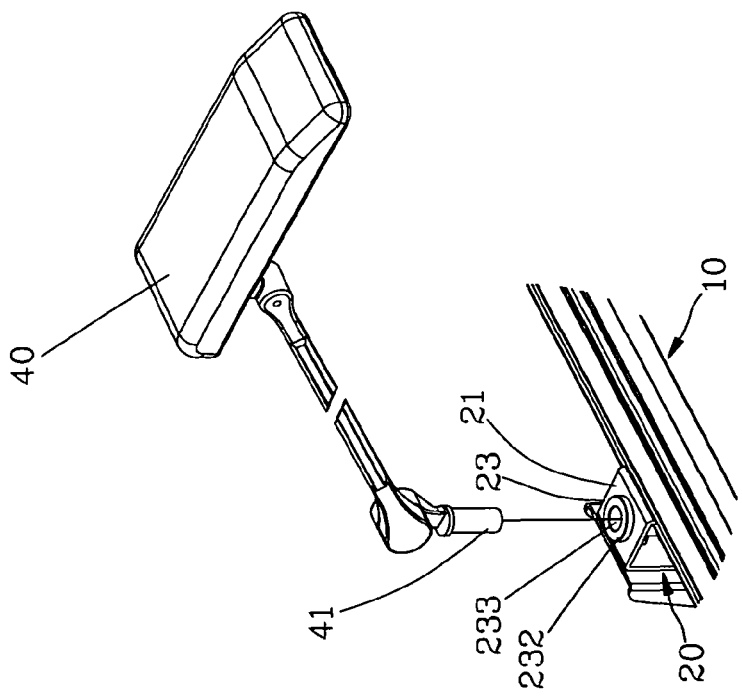
FIG. 5 is an illustrative view showing how to assemble a lamp to the rack assembly in accordance with the first embodiment of the present invention.
Figure 8:
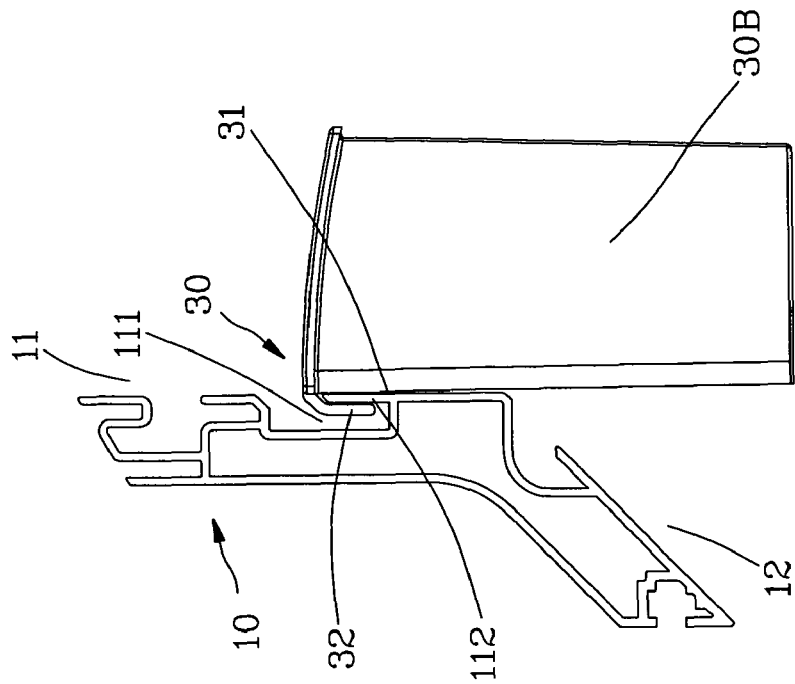
FIG. 8 is another illustrative view showing how to assemble a lamp to the rack assembly in accordance with the first embodiment of the present invention.

Each of the base plates 20, as shown in FIG. 2, is longitudinally mounted in the concave space 13 of the main frame 10 and includes a horizontal top portion 21 and a longitudinal portion 22. The end 21A of the top portion 21 is fixed to a top of the rear surface of the first display area 11. A through hole 211 is defined in the top portion 21 for pivotally and detachably insertion of a positioning sleeve 23 which includes a neck portion 231 sized correspondingly to the diameter of the through hole 211 and a head portion 232 stopped against an outer peripheral edge of the through hole 211. The positioning sleeve 23 is further axially provided with a positioning hole 233 for insertion of a positioning shaft 41 of a lamp holder 40, as shown in FIG. 5. The longitudinal portion 22 is formed with at least one hanging hole 221 and a plurality of positioning threaded holes 222 for fixing to an object, such a wall 50. As shown in FIG. 4, the longitudinal portion 22 of each base plate 20 is fixed to the wall 50 by a screw 51 screwed through the hanging hole 221.

The suspension members 30, as shown in FIGS. 6-9, are detachably engaged in the first and second limiting grooves 111, 121 and each are provided with an abutting portion 31 to be abutted against the first and second rails 112, 123, and a retaining portion 32 to be engaged in the first and second limiting grooves 111, 121.

Figure 6:
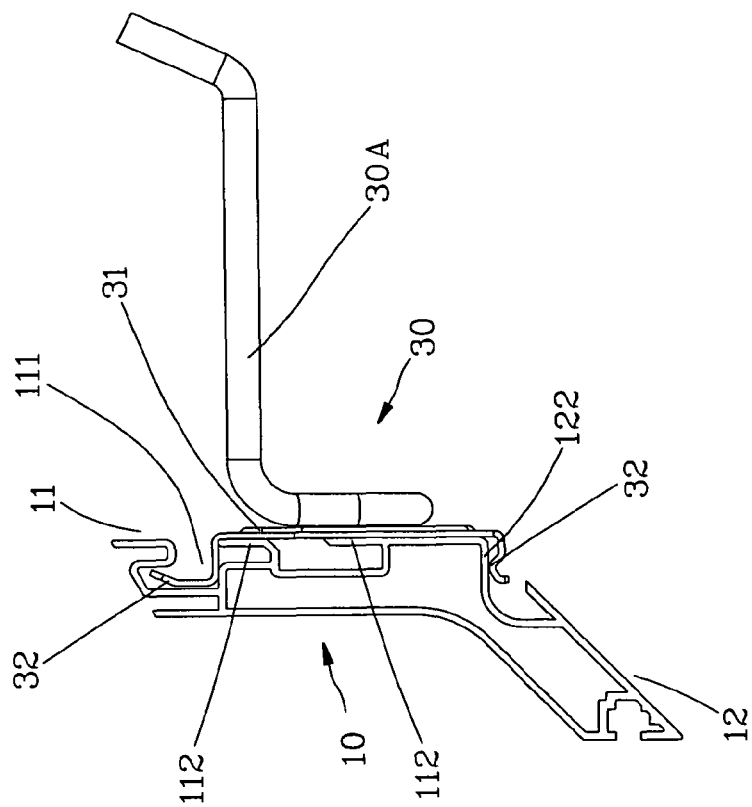
FIG. 6 is an illustrative view showing how to assemble a hook to the rack assembly in accordance with the first embodiment of the present invention.

The suspension members 30 of the present invention are designed to be in the form of pen holder, LCD stand, audio rack, and etc. as shown in FIG. 6, to the end of the abutting portion 31 of the each suspension member 30 is fixed a hook 30A, and the top and bottom edges of the abutting portion 31 are horizontally formed to form the retaining portion 32 for personal belongings or stationery box.

Figure 7:
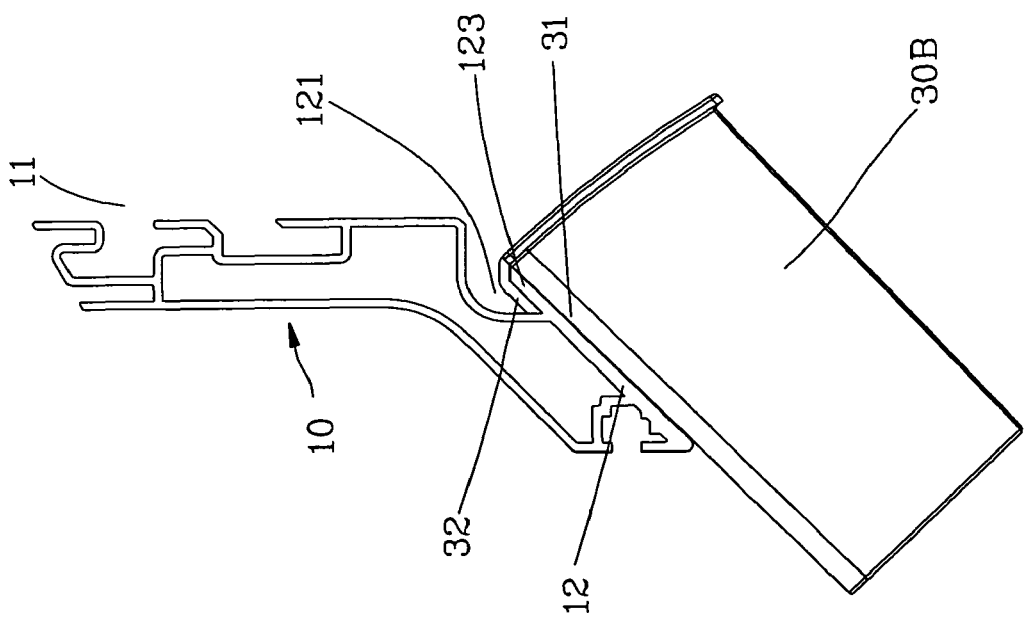
FIG. 7 is an illustrative view showing how to hang a pen holder to the rack assembly in accordance with the first embodiment of the present invention.

As shown in FIG. 7, the abutting portion 31 of the suspension members 30 extends laterally to form a pen holder 30B for storage of stationery. The pen holder 30B can be engaged in the second display area 12 in such a manner that the abutting portion 31 is pressed against the second rail 123, so that the pen holder 30B is arranged in an inclined manner. Or the pen holder 30B can be vertically disposed by engaging in the first display area 11.

Figure 9:
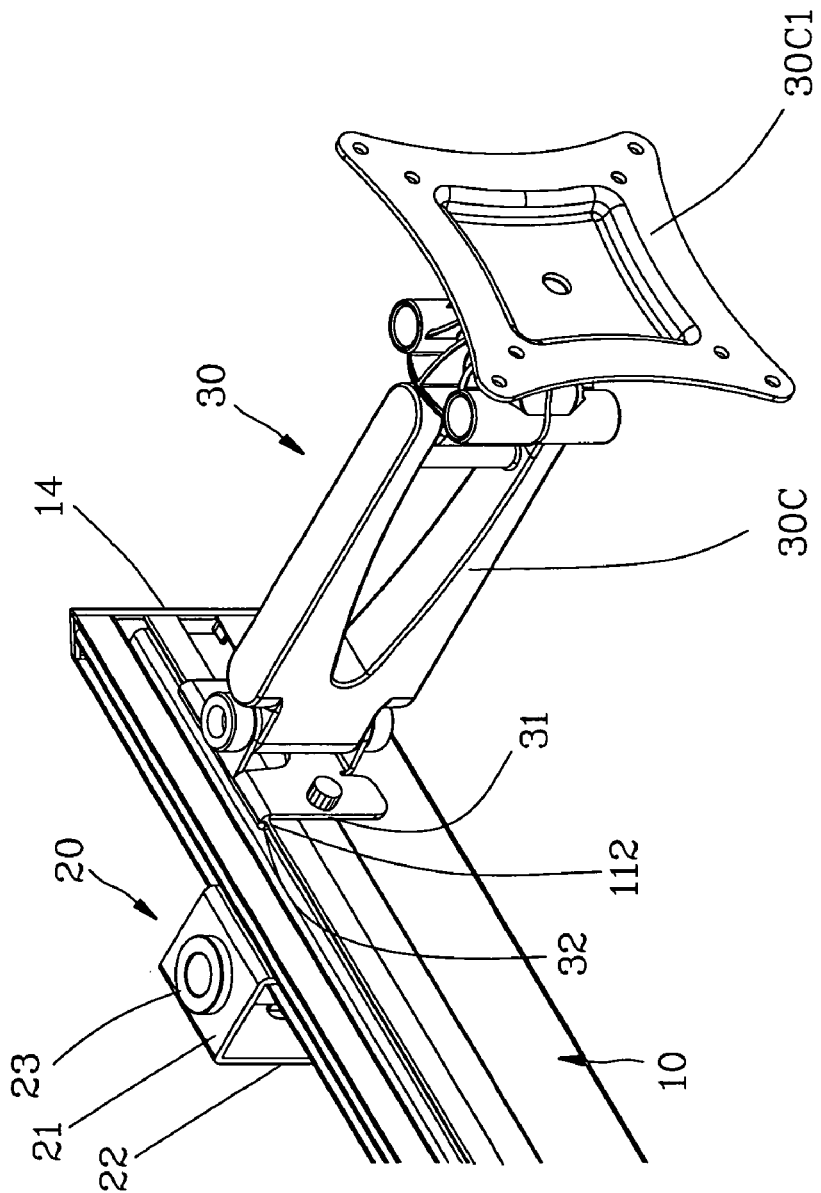
FIG. 9 is an illustrative view showing how to assemble a multipurpose rack to the rack assembly in accordance with the first embodiment of the present invention.

Referring then to FIG. 9, to the end of the abutting portion 31 of the suspension members 30 is fixed a multipurpose rack 30C the end of which is provided with a holding board 30C1 for holding of LCD display, keyboard, sound box, monitor, and etc.

The device of the present invention can cooperate with different suspension members 30 by resting the abutting portion 31 against the first or second rail 112, 123, meanwhile, the retaining portion 32 is engaged and restricted in the first or second limiting grooves 111, 121, so as to fix the suspension members 30 to the main frame 10, and the suspension members 30 can be horizontally adjustable along the first and second rails 112, 123. Furthermore, the user can hang different suspension members 30 to the wall and can adjust their positions at pleasure, thus considerably improving the applicability and feasibility of the rack assembly.

Figure 10:
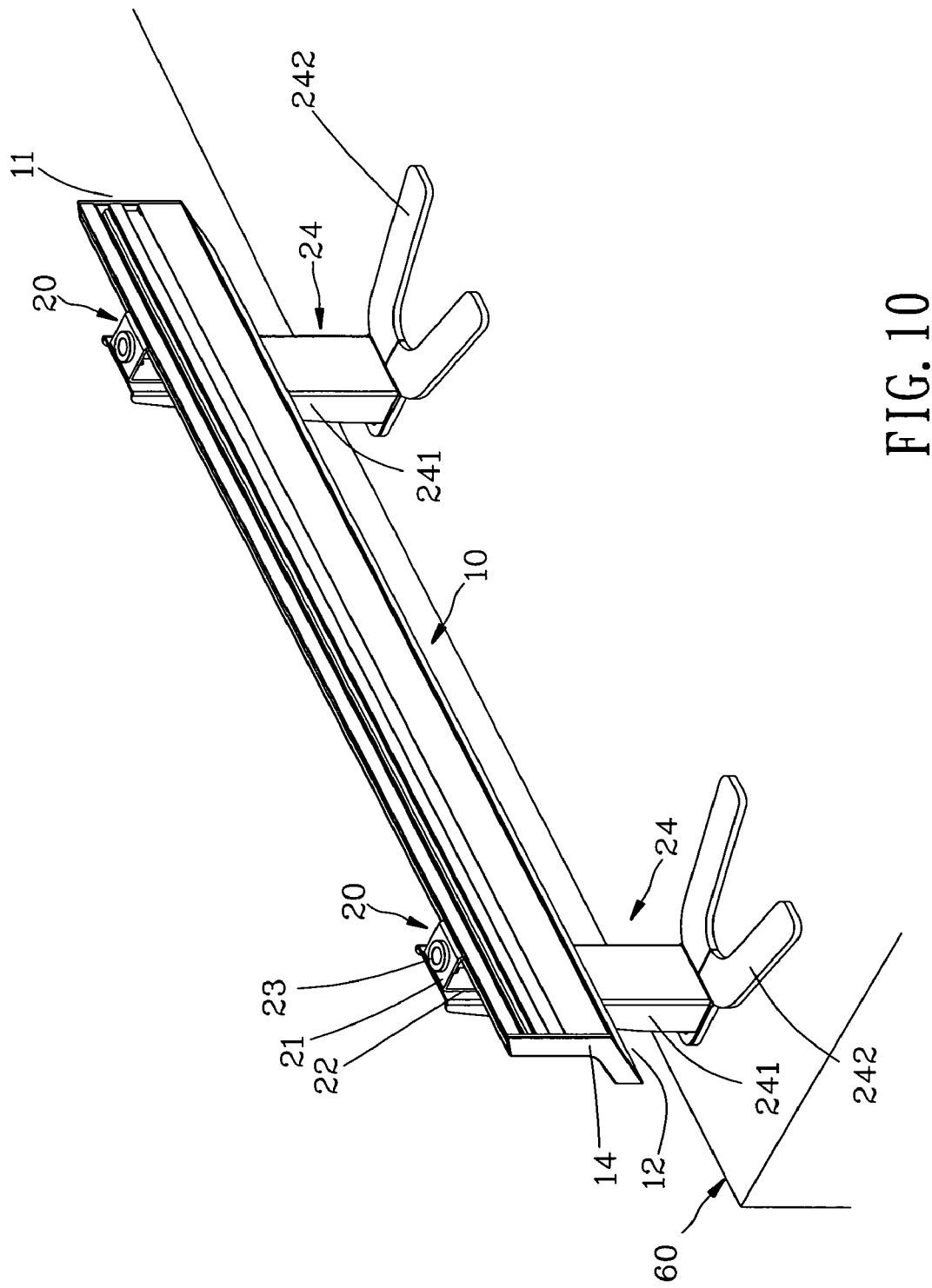
FIG. 10 is an assembly view of a rack assembly in accordance with a second embodiment of the present invention, which is put on a table.
Figure 12:
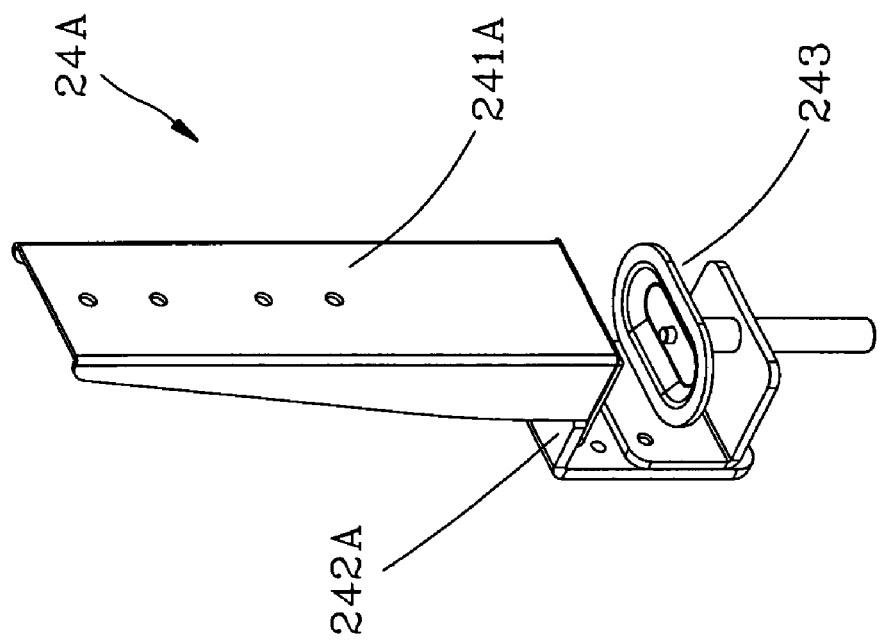
FIG. 12 is a perspective view of a seat of a rack assembly in accordance with a third embodiment of the present invention, which is put on a table.
Figure 11:
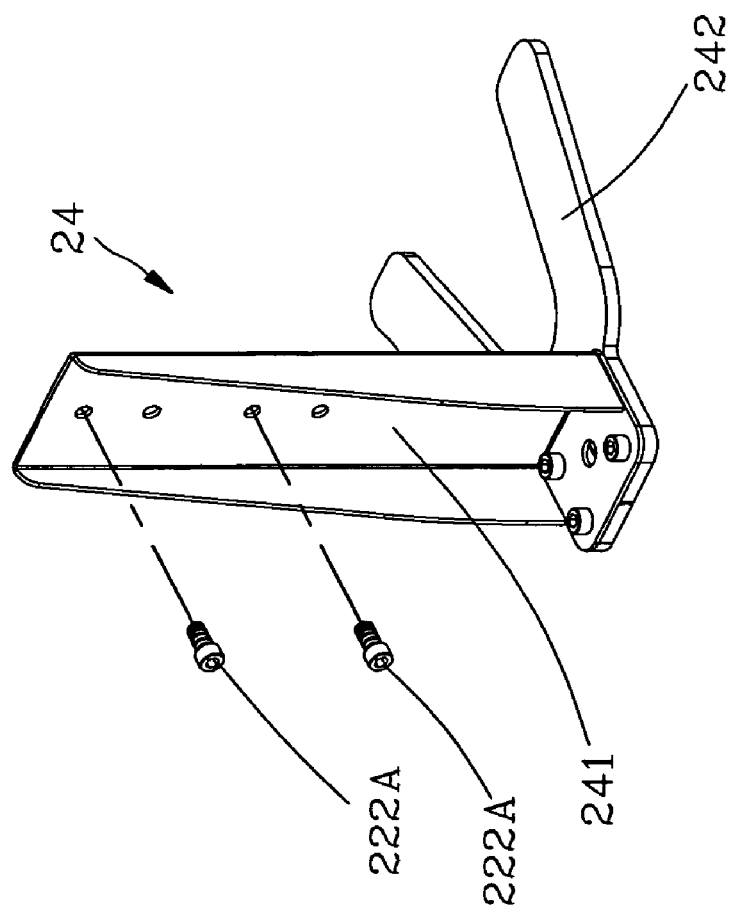
FIG. 11 is a perspective view of a seat of the rack assembly in accordance with the second embodiment of the present invention, which is put on a table.

Referring then to FIGS. 10-12, another embodiment of the present invention is shown, wherein the longitudinal portion 22 of the base plates 20 is additionally provided with a seat 24 which includes a supporting portion 241 and a horizontal extending positioning portion 242. The supporting portion 241 is fixed to the positioning threaded holes 222 of the longitudinal portion 22 by screws 222A, and the positioning portion 242 is used to stand on a table 60, so that the combination of the main frame 10 and the base plates 20 can be put on the table, and then the user can hang different suspension members 30 to the first and second display areas 11, 12 as desired. Hence, the applicability of the rack assembly of the present invention is substantially improved.

To enable the rack assembly of the present invention to be more stably mounted the table, as shown in FIG. 12, a positioning portion 242A of a seat 24A according to a third embodiment of the present invention is additionally provided with a C-shaped clamp 243 which is used to clamp the edge of the table 60.

While we have shown and described various embodiments in accordance with the present invention, it is clear to those skilled in the art that further embodiments may be made without departing from the scope of the present invention.

What is claimed is:

1. A rack assembly comprising: an elongated main frame, a front surface of which extends longitudinally to form a first display area, and a lower edge of the first display area being folded and then extending downward at an inclined angle to form a second display area, a concave space being defined between a rear surface of the first display area and the second display area, the first display area being longitudinally defined with a plurality of parallel and spaced-apart first limiting grooves, each of the first limiting grooves being provided with a longitudinally-extending first rail, the second display area being provided with at least one second limiting groove which is defined with an upper horizontally-extending abutting portion and a lower inclined second rail; at least one base plate longitudinally mounted in the concave space of the main frame and including a horizontal top portion and a longitudinal portion, one end of the top portion being fixed to a top of the rear surface of the first display area, a positioning sleeve being pivotally and detachably disposed on the top portion of the base plate and provided for insertion of a personal belonging with a positioning shaft, the longitudinal portion of the base plate is formed with at least one hanging hole and a plurality of positioning threaded holes for fixing to an object, the longitudinal portion of each base plate is fixed to an object by a screw screwed through the hanging hole; and a plurality of suspension members detachably engaged in the first and second limiting grooves and each being provided with an abutting portion to be abutted against the first and second rails, and a retaining portion to be engaged in the first and second limiting grooves.

2. The rack assembly as claimed in claim 1, wherein each of two ends of the main frame is covered with a covering plate.

3. The rack assembly as claimed in claim 1, wherein the longitudinal portion of the base plate is fixed to a wall by a screw screwed through the hanging hole.

4. The rack assembly as claimed in claim 1, wherein the longitudinal portion of the base plate is additionally provided with a seat which is used to stand on a table, the seat includes a supporting portion and a horizontal extending positioning portion.

5. The rack assembly as claimed in claim 4, wherein the positioning portion of the seat is additionally provided with a C-shaped clamp which is used to clamp an edge of the table.

6. The rack assembly as claimed in claim 1, wherein the abutting portion of the suspension members extends laterally to form a pen holder for storage of stationery.

7. The rack assembly as claimed in claim 1, wherein a through hole is defined in the top portion of the base plate, the positioning sleeve includes a neck portion sized correspondingly to a diameter of the through hole and a head portion stopped against an outer peripheral edge of the through hole of the base plate, and the positioning sleeve is further axially provided with a positioning hole for insertion of a positioning shaft of a lamp holder.

8. The rack assembly as claimed in claim 1, wherein a multipurpose rack is fixed at an end of the abutting portion of the suspension members, one end of the multipurpose rack is provided with a holding board for holding of LCD display, keyboard, sound box, monitor.

* * * * *